(12) United States Patent
Kooijker et al.

(10) Patent No.: US 8,991,306 B2
(45) Date of Patent: Mar. 31, 2015

(54) TEMPERATURE CONTROL VALVE ASSEMBLY AND BEVERAGE PREPARING APPARATUS EQUIPPED THEREWITH

(75) Inventors: Klaas Kooijker, Drachten (NL); Gertrude Riette Van Der Kamp, Groningen (NL); Pawel Leshem, Drachten (NL); Anke Sinnema, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 528 days.

(21) Appl. No.: 12/739,164

(22) PCT Filed: Oct. 28, 2008

(86) PCT No.: PCT/IB2008/054433
§ 371 (c)(1),
(2), (4) Date: Apr. 22, 2010

(87) PCT Pub. No.: WO2009/057037
PCT Pub. Date: May 7, 2009

(65) Prior Publication Data
US 2010/0300302 A1  Dec. 2, 2010

(30) Foreign Application Priority Data
Oct. 31, 2007  (EP) .................................. 07119710

(51) Int. Cl.
*A23F 3/00* (2006.01)
*A47J 31/40* (2006.01)
*A47J 31/52* (2006.01)

(52) U.S. Cl.
CPC ................ *A47J 31/402* (2013.01); *A47J 31/52* (2013.01)

USPC ............................................ 99/323.3; 99/282

(58) Field of Classification Search
CPC .................................. A47J 31/52; A47J 31/402
USPC ............ 99/323.3, 275, 290, 300, 302 R, 307, 99/306, 280, 283
See application file for complete search history.

(56) References Cited

U.S. PATENT DOCUMENTS 4,479,758 A * 10/1984 Hersom et al. ................ 417/388
5,419,213 A * 5/1995 Karlyn et al. .................... 74/437
5,975,365 A * 11/1999 Hsieh .......................... 222/129.4

(Continued)

FOREIGN PATENT DOCUMENTS

GB  2405602 A  3/2005
JP  56155170 U  11/1981

(Continued)

*Primary Examiner* — Henry Yuen
*Assistant Examiner* — Phuong Nguyen

(57) ABSTRACT

Valve assembly (8) for fine tuning the temperature of some fluid that has been heated or cooled in a heat exchanging section of a beverage making apparatus (1). The valve assembly (8) comprises a mixing valve (10), having a first inlet (21) for fluid communication with an outlet of the heat exchanging section (6), a second inlet (22) for fluid communication with a source of a hotter or colder version of aforementioned fluid, first and second closing means for altering a flow rate through the first and second inlet respectively, and control means arranged to control the first and second closing means in such way that an increase in flow rate through one of the inlets is matched by a substantially similar sized decrease in flow rate through the other inlet, so that the total flow rate through the mixing valve remains substantially constant.

12 Claims, 6 Drawing Sheets

(56) References Cited

U.S. PATENT DOCUMENTS

| | | |
|---|---|---|
| 6,202,894 B1 | 3/2001 | Struminski et al. |
| 6,213,199 B1 * | 4/2001 | Al-Khateeb .................. 165/258 |
| 7,036,687 B1 | 5/2006 | Lowe |
| 2003/0060994 A1 | 3/2003 | Deng et al. |
| 2006/0042470 A1 * | 3/2006 | Anson ............................ 99/275 |
| 2006/0278093 A1 * | 12/2006 | Biderman et al. .............. 99/282 |
| 2008/0202612 A1 * | 8/2008 | Weijers ......................... 137/625 |

FOREIGN PATENT DOCUMENTS

| | | |
|---|---|---|
| JP | 08156997 A | 6/1996 |
| JP | 2003035379 A | 2/2003 |
| JP | 2004188055 A | 7/2004 |
| WO | 9006465 A1 | 6/1990 |
| WO | 9747224 A1 | 12/1997 |
| WO | 03107109 A2 | 12/2003 |
| WO | 2005060800 A1 | 7/2005 |

* cited by examiner

TEMPERATURE CONTROL VALVE ASSEMBLY AND BEVERAGE PREPARING APPARATUS EQUIPPED THEREWITH

FIELD OF THE INVENTION

The invention relates to a valve assembly and an apparatus making use of such valve assembly, in particular an apparatus for preparing a beverage of a desired temperature.

BACKGROUND OF THE INVENTION

In many beverage preparing apparatuses, at some stage in the preparation process, the beverage or some fluid ingredient thereof is passed along a heat exchanging section so as to heat or cool said fluid to a desired temperature. For instance, when preparing baby milk from water and formula, the water may first be passed along heating means to sanitize the water and subsequently be passed along cooling means to cool down the water to a suitable consumption temperature. The exact temperature of the fluid that leaves said heat exchanging section may vary, depending on for instance the temperature of the fluid when it enters the section, the flow rate through the section, etc.

To control said temperature more accurately, a valve assembly may be provided for mixing the fluid with a colder or hotter version of itself, which colder or hotter version may be tapped from some upstream or downstream point in the apparatus or some external source. To set the appropriate mixing ratio between said fluids, known mixing valves are provided with a heat sensitive body that expands when the temperature of the mixed fluids deviates from a desired temperature. This expansion causes the inflow of one of the fluids to be reduced and consequently the mixing ratio and resulting mixing temperature to be changed.

A disadvantage of these known mixing valves is that the heat sensitive body needs a rather large flow rate to function properly. Such large flow rate will usually not be available in an apparatuses according to the invention. And when it is available, such large flow rate will cause a large amount of too cold or too hot fluid to have passed the valve by the time that the valve has reached its optimum setting. Also, the output flow of the known mixing valves varies depending on the selected mixing ratio. Consequently, when the mixing valve is to supply a specific amount of fluid (which will often be the case in an apparatus according to the present invention) a special flow rate sensor or other suitable sensor will be needed for metering the desired quantity. This renders the apparatus more costly and complex.

Therefore, there exists a need for an improved temperature control valve assembly for use in apparatuses which operate with relatively small but preferably constant flow rates, such as apparatuses for preparing a beverage.

SUMMARY OF THE INVENTION

To that end, an apparatus according to the invention comprises a fluid supply system with at least one heat exchanging section for cooling or heating a fluid that is passed there along, and a valve assembly with a mixing valve. The mixing valve has a first inlet which is in fluid communication with an outlet of the heat exchanging section of the apparatus, a second inlet which is in fluid communication with a source of a hotter or colder version of aforementioned fluid, first and second closing means for altering a flow rate through the first and second inlet respectively, and control means arranged to control the first and second closing means in such way that an increase in flow rate through one of the inlets is matched by a substantially similar sized decrease in flow rate through the other inlet.

Thanks to such valve assembly, the total flow rate through the mixing valve will remain substantially constant, regardless of the mixing ratio that is necessary to control the temperature of the output fluid. Accordingly, with a valve assembly according to the invention, it is possible to supply predetermined amounts of fluid of an accurately controlled temperature, by simply controlling the time during which the valve assembly is opened.

The assembly moreover can function with small flow rates now that the mixing ratio is not set by some heat sensitive body, but by control means which may actively control the position of the first and second closing means based on for instance a temperature measurement on the fluid leaving the valve assembly.

The first and second closing means may be controlled by separate driving means. However, according to an advantageous aspect, the first and second closing means may be mechanically interconnected and controlled by a single driving means. In such case the first closing means and the first inlet may be designed to be the mirror image of the second closing means and the second inlet, so that a change in the position of the first closing means and an accompanying change in the passage way of the first inlet will result in a change in the passage way of the second inlet of similar size but opposite sign. However, when the fluid entering the mixing valve through the first inlet enters said valve with a different pressure than the fluid entering the mixing valve through the second inlet, the design of the first closing means will differ slightly from the design of the second closing means. In case of a higher pressure at the first inlet, the respective design of the first closing means and the second closing means is such that at changing the position of said closing means the size of the passage way of the first inlet is increased or decreased less relative to the accompanying decrease of increase in size of the passage way of the second inlet through which the fluid with a lower pressure enters the mixing valve.

According to another advantageous aspect of the invention, a second valve may be provided, arranged to redirect the flow rate leaving the mixing valve in either one of two directions. Thus, this second valve can let through fluid of the desired temperature and lead away fluid of another temperature.

According to yet another advantageous aspect of the invention, the second valve may have the same configuration of the mixing valve. This may help to reduce the costs of the valve assembly.

According to a further advantageous aspect of the invention, the control of the second valve and the mixing valve may be done by the same driving means. This too may help to reduce the costs of the assembly.

The invention furthermore relates to a valve assembly with anyone of the aforementioned characteristics for use in a beverage making apparatus according to the invention.

Further advantageous embodiments of an apparatus and valve assembly according to the present invention are set forth in the dependent claims.

BRIEF DESCRIPTION OF THE DRAWINGS

To explain the invention, exemplary embodiments thereof will hereinafter be described with reference to the accompanying drawings, wherein.

DETAILED DESCRIPTION OF EMBODIMENTS

In the following description, a valve assembly 8 according to the invention will be described with reference to its application in an apparatus 1 for preparing a beverage. It should however be understood that the valve assembly 8 can be advantageously used in other appliances, notably any apparatus in which a fluid needs to be heated and/or cooled to a desired temperature.

Figure 1:
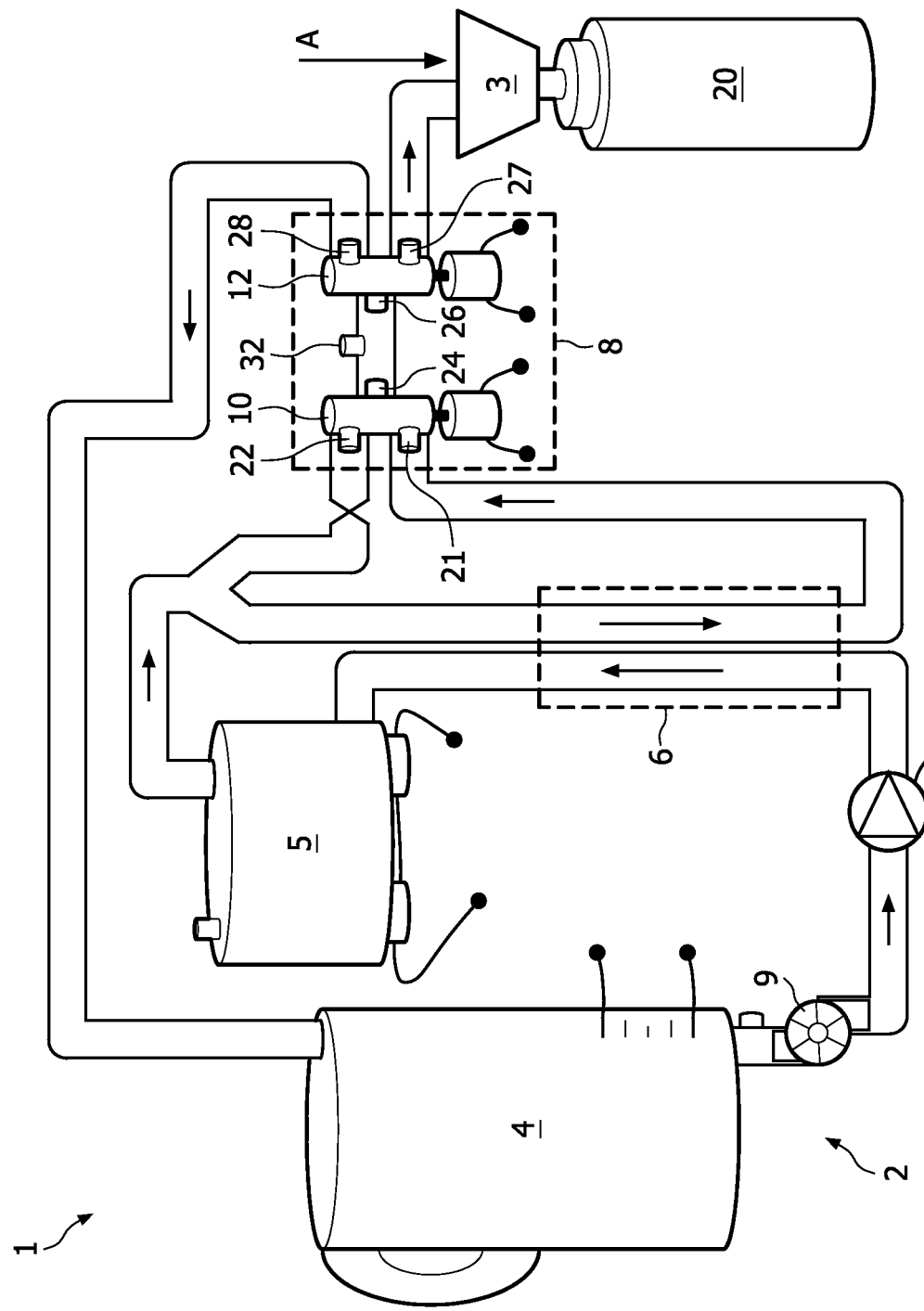
FIG. 1 schematically shows the lay-out of an apparatus according to the invention for preparing a beverage.

FIG. 1 schematically shows an apparatus 1 for preparing a beverage, for instance baby milk from water and formula. The apparatus 1 comprises a water supply system 2 and a formula supply system (schematically represented by arrow A) for dosing desired amounts of water, respectively formula in a mixing system 3, or a receptacle such as a baby bottle 20, after which mixing can be done manually.

The water supply system 2 comprises a water reservoir 4, a first heat exchanging section 5, a second heat exchanging section 6, a valve assembly 8 and suitable supply lines and pumping means 9 for transporting the water along the aforementioned components. Instead of or in addition to the water reservoir 4, the water supply system 2 may comprise a direct connection to a tap water main.

In the present embodiment the first heat exchanging section 5 is arranged to heat the water, in order to kill or inactivate bacteria. This section 5 may for instance comprise a boiler, an electric coil or any other suitable heating means.

The second heat exchanging section 6 is arranged to cool down the water to a desired temperature, for instance to a temperature ready for consumption. For baby milk, such temperature may for instance range from room temperature to about 45° Celsius with a preference for about 37° Celsius. This second heat exchanging section 6 may for instance include a heat exchanger, more particularly a counter flow heat exchanger, in which the water to be cooled and a cooling fluid are passed along one another in opposed flow direction. With such counter flow heat exchanger a relatively large amount of heat can be withdraw from the hot water, resulting in relatively short cooling down times. According to an advantageous embodiment, the cooling fluid may comprise water that is headed for the first heat exchanging section 5. Thus, energy can be saved, as the water entering the first heat exchanging section 5 will already have been preheated. Consequently, less energy will be needed to heat this water to a desired temperature.

The valve assembly 8 is arranged to mix the cooled water leaving the second heat exchanging section 6 with hotter water, so as to fine tune the temperature of the former water to a desired value. To that end, the valve assembly 8 comprises a mixing valve 10 with two inlets 21, 22, an outlet 24 and a piston 25, as best seen in FIG. 2. The first inlet 21 is in fluid communication with an outlet of the second heat exchanging section 6. The second inlet 22 is in fluid communication with the outlet of the first heat exchanging section 5. To control a flow rate ratio through the respective inlets 21, 22, the piston 25 can be reciprocated between two ultimate positions, in which one of the inlets 21, 22 is fully opened and the other one is fully closed, and any intermediate position.

According to an alternative embodiment, the second inlet 22 could be in fluid communication with another hot water source, for instance an external source or another section of the water supply system 2. However, using the water of the first heat exchanging section 5 offers the advantage that this water will generally be of a well known and/or well controlled temperature. This will render control of the mixing valve 10, in particular setting of the correct mixing ratio, easier. Furthermore, said hot water will be guaranteed clean now that it has undergone the same purifying treatment in the first heat exchanging section 5 as the water of which the temperature is to be controlled.

Figure 3:
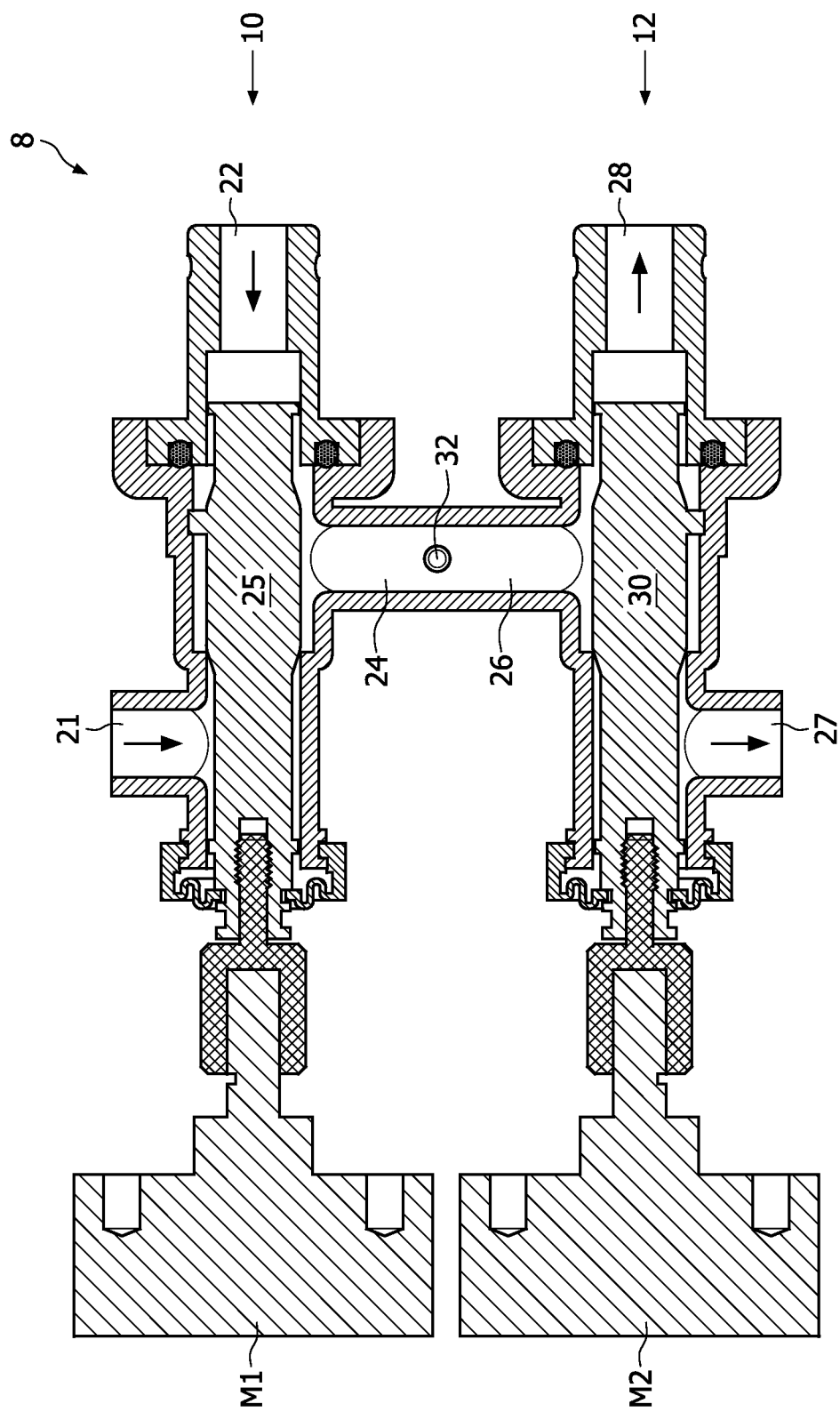
FIG. 3 shows, in cross sectional view, a valve assembly according to the invention, for use in the apparatus of FIG. 1.

The valve assembly 8 further comprises a second valve 12 for letting through water of a particular temperature and leading away all other water. To that end, the second valve 12 can be configured as a three-way valve, as best seen in FIG. 3, with an inlet 26, two outlets 27, 28 and a piston 30. The inlet 26 is in fluid communication with the outlet 24 of the mixing valve 10. The first outlet 27 is in fluid communication with an inlet of the mixing system 3. The second outlet 28 is in fluid communication with the reservoir 4. The piston 30 can be reciprocated between two ultimate positions only, in which the first outlet 27 is either fully opened or fully closed and the second outlet 28 is fully closed, respectively fully opened.

The valve assembly 8 may further include a temperature sensor 32, which may for instance be arranged near the outlet 24 of the mixing valve 10, and a control unit (not shown) for controlling the movements of the respective pistons 25, 30 on the basis of measured data received from the sensor 32.

The afore described apparatus may function as follows. When baby milk is to be prepared, water from the reservoir 4 is pumped along the first heat exchanging section 5 where the water is heated so as to kill bacteria. The water is subsequently passed along the second heat exchanging section 6 for cooling down the water to a desired temperature, for instance consumption temperature. Preferably, this second heat exchanging section 6 is dimensioned such that the temperature of the water that leaves this section will vary between its desired temperature and some lower value. This water is then passed along the valve assembly 8, where the water temperature will be measured by sensor 32. If the water temperature is of the desired value, the control unit will control piston 30 to fully open the first outlet 27 of the second valve 12, so as to pass the water to the mixing system 3. If on the other hand, the actual water temperature deviated from the desired temperature, the control unit will control piston 30 to fully open the second outlet 28 so as to return said water to the reservoir 4. At the same time, the control unit will alter the position of the piston 25, so as to alter the mixing ratio of the mixing valve 10, more particularly, so as to reduce the flow of water through the first inlet 21 and increase the flow of hot water through the second inlet 22. When the water reaches the desired temperature, the position of the piston 30 may be shifted again, so as to let this water pass to the mixing system 3.

Figure 2A:
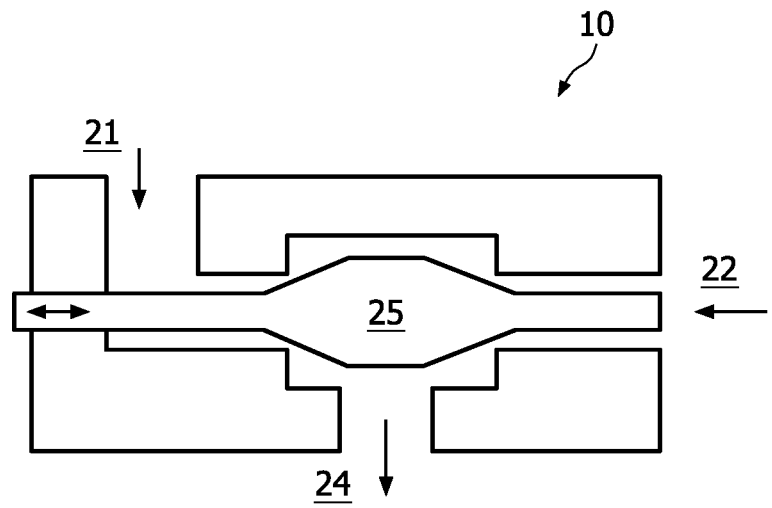
FIG. 2a shows schematically, in cross sectional view, a mixing valve according to the invention, for use in the apparatus of FIG. 1.
Figure 2B:
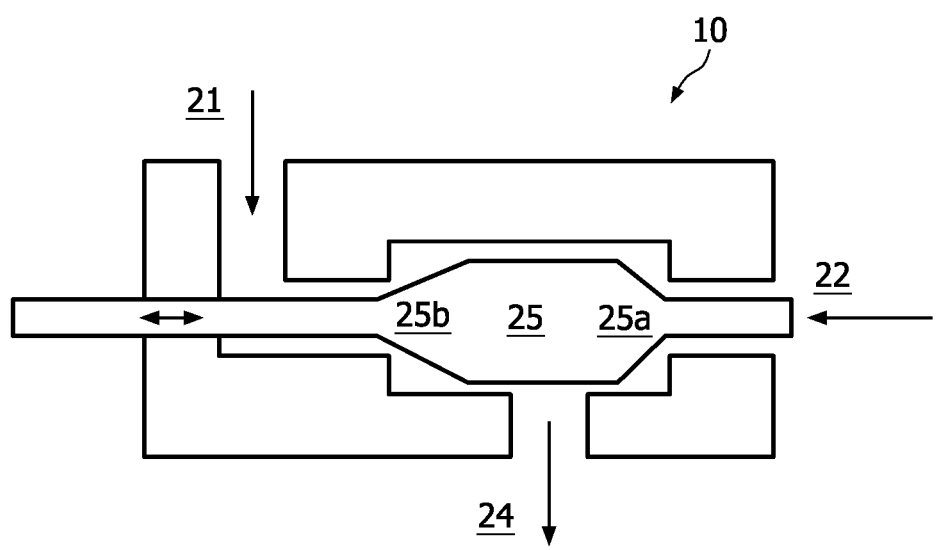
FIG. 2b shows schematically, in cross sectional view, another mixing valve according to the invention, for use in the apparatus of FIG. 1.

From FIG. 2a it may be seen that the design of the piston 25 and the first and second inlet 21, 22 is symmetrical. This offers the advantage that an increase in flow rate through one of the inlets 21, 22 will be accompanied by an equally sized decrease in flow rate through the other inlet 22, 21. Thus, the total flow rate leaving the mixing valve 10 will remain substantially constant. The same is true for the second valve 12, which simply acts to redirect this total flow rate to one of two directions (i.e. to the mixing system 3 or the reservoir 4). Consequently, the flow rate leaving the valve assembly 8 will be substantially constant. This is especially beneficial in case where the water supply system 2 is to supply a specific, predetermined amount of fluid (which often is the case in beverage preparing apparatuses). Since the flow rate leaving the valve assembly 8 is constant, such predetermined amount can be readily metered by controlling the time that the first outlet 27 is opened. Accordingly, the need for an additional flow rate sensor can be dispensed with. In FIG. 2b a different design of the piston, in this case plunger 25 is shown. This a-symmetrical plunger 25 is used in case of a difference in pressure of the water supplied through the first inlet 21 and the water supplied through the second inlet 22. In case that the water entering the mixing valve 10 through the first inlet 21, is supplied at a relatively high pressure and the water entering the mixing valve 10 through the second inlet 22, is supplied at a relatively low pressure, increase and decrease of the flow rates of said inlets 21, 22 will still be equally sized, resulting in a constant flow rate leaving the valve assembly 8. However, the respective passage ways will in this case not be equally sized. The passage way allowing the water at the high pressure side 25b of the plunger 25 to pass to the mixing valve 10 will increase or decrease less in size than the accompanying passage way allowing the water at the low pressure side 25a of the plunger 25 to pass to the mixing valve 10. This can be accomplished with a plunger 25 with an a-symmetrical configuration as shown in FIG. 2b. It is clear that the design of said plunger 25 is adapted to the respective different pressures of the supplied water to pass the respective inlets 21, 22. A change in position of the plunger 25, for instance a shift of the plunger 25 towards the first inlet 21, will result in a larger change in size of the passage way, thus a larger increase in size, at the second inlet 22 than the change in size of the passage way, thus a smaller decrease in size, at the first inlet 21 and vice versa. It is clear that the plunger 25 can have a different shape than shown in FIG. 2b thereby still providing the same way of controlling the passage ways of the two inlets 21, 22 as described.

Figure 4:
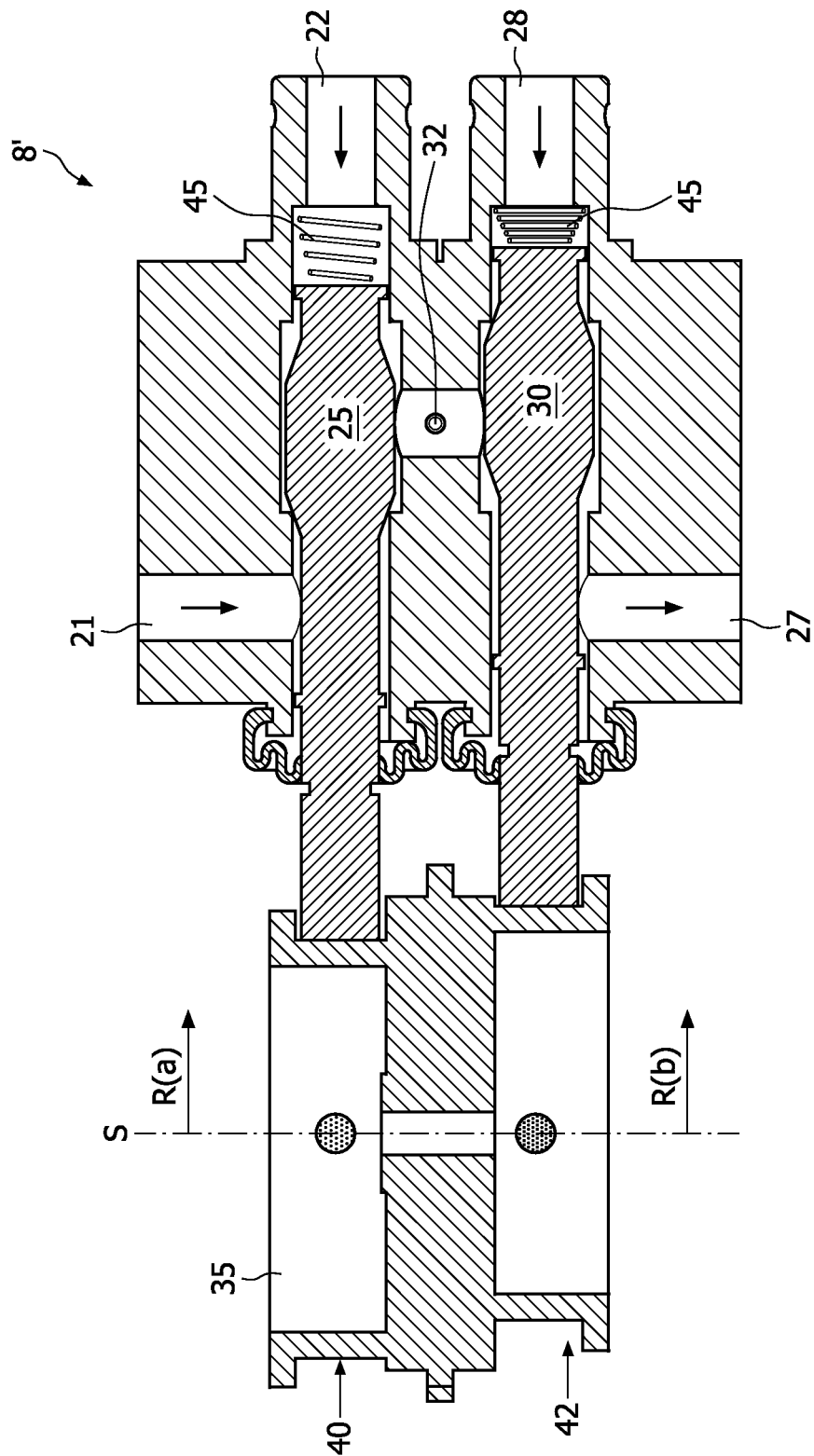
FIG. 4 shows, in cross sectional view, an alternative embodiment of the valve assembly of FIG. 3, wherein the respective valves can be operated with a single driving means.

In the embodiment according to FIG. 3, the mixing valve 10 and the second valve 12 are of substantially similar configuration. This may help to minimize the production costs of the valve assembly 8. It may further be noticed that the pistons 25, 30 of the respective valves 10, 12 are driven by two separate motors M1, M2. Further production costs can be saved, by driving both pistons 25, 30 by a single motor M, according to the embodiment 8' of FIG. 4 (wherein the motor itself is not shown). To allow the pistons 25, to be reciprocated independent of one another, use is made of a special cam 35, of which an embodiment is shown in FIGS. 5a-5d.

Figure 5A:
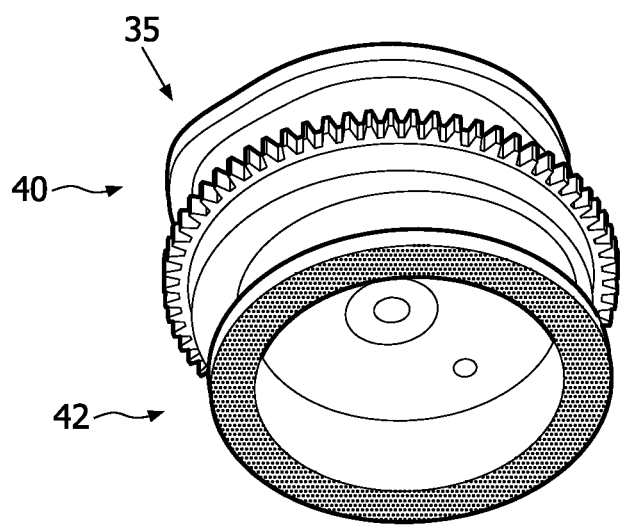
FIGS. 5a-5d show in further detail an embodiment of a cam which can be used to drive the respective valves in the valve assembly of FIG. 4.
Figure 5B:
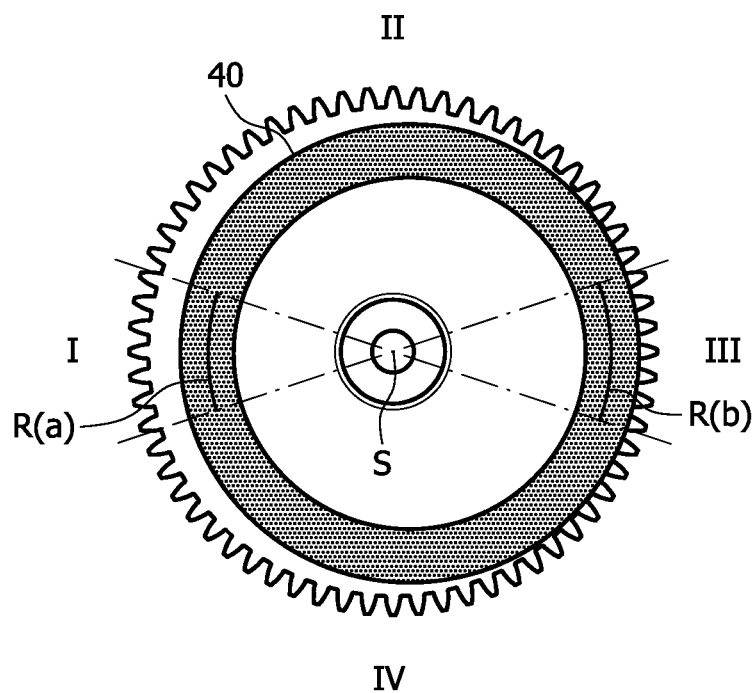
Figure 5C:
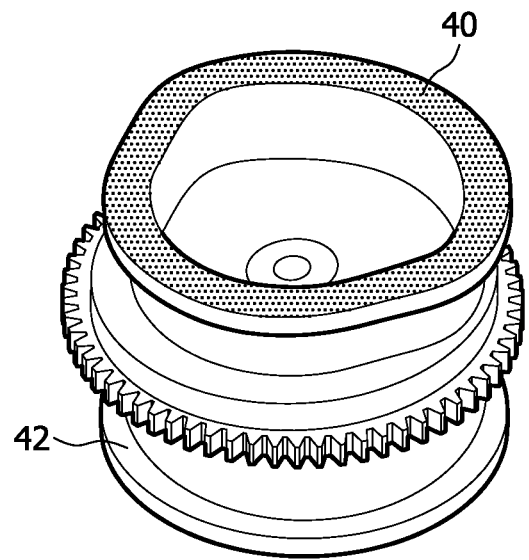
Figure 5D:
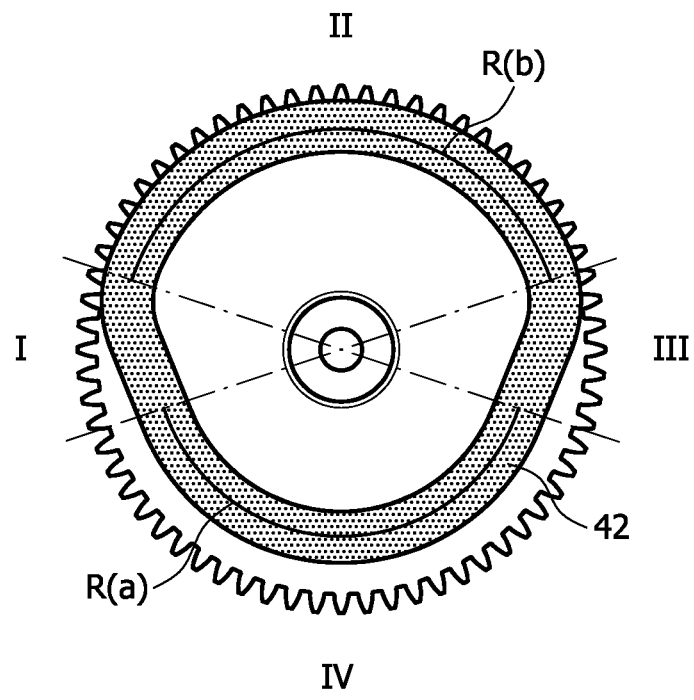

The cam 35 comprises an upper ring shaped cam surface 40 for driving piston 25 and a lower ring shaped cam surface 42 for driving piston 30 as shown in FIGS. 5a and 5c. The cam surfaces 40, 42 are eccentrically arranged with regard to a main rotation axis S of the cam 35, and each divided into four segments I-IV, which are diametrically opposed in pairs as shown in FIGS. 5b and 5d. The circumferential length of the second pair of segments II, IV is considerably longer than that of the first pair I, III. In each segment I-IV the radius R of the cam surfaces 40, 42 differs according to a predetermined path.

The upper cam surface 40 has a minimal radius R (a) in segment I and a maximal radius R (b) in segment III. In the intermediate segments II, IV the radius R increases very gradually from the minimal value R (a) to the maximal value R (b) as shown in FIG. 5b. Conversely, as shown in FIG. 5d, the lower cam surface 42 has a minimal radius R (a) in segment IV and a maximal radius R (b) in segment II. In the intermediate segments I, III its radius R increases quite rapidly from the minimal value R (a) to the maximal value R (b).

The difference between the minimal and maximal radius R (a), R (b) corresponds with the maximum possible stroke of the pistons 25, 30. Biasing means 45 are provided (see FIG. 4) to bias the pistons 25, 30 towards the respective cam surfaces 40, 42.

Thanks to the specific cam design, the pistons 25, 30 can be adjusted independent from each other. More particularly, segment I can be used for swiftly reciprocating piston 30 between its two ultimate positions while piston 25 remains unaffectedly in its ultimate position wherein it blocks inlet 21 (which corresponds to the position shown in FIG. 4). Segment III can be used to swiftly reciprocate piston 30 between its two ultimate positions, while piston 25 remains unaffectedly in its other ultimate position, wherein it blocks inlet 22. In a similar way, segments II and IV can be used to reciprocate piston 25 between its ultimate and every intermediate positions, while the piston 30 remains unaffectedly in one of its ultimate positions wherein it fully blocks the second outlet 28, respectively fully blocks the first outlet 27.

The invention is not in any way limited to the exemplary embodiments presented in the description and drawing. All combinations (of parts) of the embodiments shown and described are explicitly understood to be incorporated within this description and are explicitly understood to fall within the scope of the invention. Moreover, many variations are possible within the scope of the invention, as outlined by the claims.

The invention claimed is:

1. An apparatus for preparing a beverage, the apparatus comprising:
    a heating section configured to receive and to heat a fluid at a heated reservoir temperature to produce a fluid at a high temperature;
    at least one heat exchanging section configured to exchange heat between a portion of the fluid at the high temperature and a fluid at a reservoir temperature to produce a fluid at a cooled high temperature and the fluid at the heated reservoir temperature that is received in the heating section, and
    a mixing valve having
        a first inlet in fluid communication with the fluid at the cooled high temperature,
        a second inlet in fluid communication with the fluid at the high temperature,
        a first piston for altering a flow rate through the first and second inlet,
    an outlet, and
        a controller configured to control the first piston,
    wherein an increase in flow rate through one of the first and second inlets is matched by a substantially similar sized decrease in flow rate through the other of the first and second inlets, so that the total flow rate through the mixing valve remains substantially constant.

2. The apparatus according to claim 1, wherein the controller comprises a temperature sensor arranged near the outlet.

3. The apparatus according to claim 1, wherein the first piston closes the first and second inlets which are mechanically interconnected.

4. The apparatus according to claim 1, wherein the first piston forms a part of a plunger reciprocating between fully closed and fully opened positions of the first and second inlets, and any position in between.

5. The apparatus according to claim 1, further comprising a second valve having two further outlets, an inlet in fluid communication with the outlet, and a second piston for selectively blocking the two further outlets.

6. The apparatus according to claim 5, wherein the mixing valve and the second valve are of substantially similar configuration.

7. The apparatus according to claim 5, wherein the first and second pistons are operated by a single motor.

8. The apparatus according to claim 7, further comprising a cam having a first and second eccentric cam surface, arranged to operate the first and the second pistons substantially independently of one another.

9. The apparatus according to claim 8, wherein the first and second cam surface each comprise:

at least a first portion with a varying radius dedicated to operate the first and second pistons while the cam is rotated; and at least a second portion with a substantially constant radius dedicated to maintain the first and second pistons in one position while the cam is rotated, wherein the at least first and second portions of the first and second cam surfaces are oriented along the cam's circumference such that the first piston can be operated while the second piston is kept in one position and vice versa.

10. The apparatus according to claim 8, wherein the first and second cam surface are divided into four segments, which are diametrically opposed in pairs, the radius of a first cam surface is constant in a first pair of segments and varies in a second pair of segments, and the radius of a second cam surface is constant in the second pair of segments and varies in the first pair of segments.

11. The apparatus according to claim 10, wherein the first pair of segments has a circumferential length that is smaller than that of the second pair of segments by less than half the length of said second pair of segments.

12. The apparatus according to claim 1, wherein the apparatus is a valve assembly.

* * * * *